United States Patent [19]
Tonne

[11] Patent Number: 5,867,094
[45] Date of Patent: Feb. 2, 1999

[54] WARNING LIGHT ACCESSORY

[76] Inventor: Harry E. Tonne, 1043 Wallace Ave., Roebling, N.J. 08554

[21] Appl. No.: 985,412

[22] Filed: Dec. 4, 1997

[51] Int. Cl.$^6$ .................................................... B60Q 1/26
[52] U.S. Cl. ...................................... 340/468; 15/250.001
[58] Field of Search ................................... 340/468, 469, 340/471, 472, 473, 618; 15/250.001, 250.201

[56] References Cited

U.S. PATENT DOCUMENTS

| | | | |
|---|---|---|---|
| 2,650,355 | 8/1953 | Pieczonka | 15/250.001 |
| 3,876,284 | 4/1975 | Appleton | 359/520 |
| 5,276,937 | 1/1994 | Lan | 340/468 |
| 5,649,337 | 7/1997 | Lobner | 15/250.06 |

*Primary Examiner*—Jeffery A. Hofsass
*Assistant Examiner*—Ashok Mannava

[57] ABSTRACT

A new warning light accessory for mounting to the articulation bow of a windshield wiper arm of a vehicle's windshield wiper, preferably, on a rear windshield wiper. The inventive device includes a housing having a body portion with a pair of mounting arms extending from the back surface of the body portion. The front surface of the body portion includes a light source that emits light from the front surface when powered. The mounting arms are spaced apart from one another to define a mounting space between them which is designed for inserting a portion of a windshield wiper arm therein. A clamping member is retractably extended through one of the mounting arms into the mounting space to hold the portion of windshield wiper arm between the mounting arms. A switch is electrically coupled to the light source to permit selective powering of the light source. A power source is also included for providing power to the light source.

10 Claims, 2 Drawing Sheets

WARNING LIGHT ACCESSORY

BACKGROUND OF THE INVENTION

1. Field of the Invention

The present invention relates to windshield wiper accessories and more particularly pertains to a new warning light accessory for mounting to the articulation bow of a windshield wiper arm of a vehicle's windshield wiper, preferably, on a rear windshield wiper.

2. Description of the Prior Art

The use of windshield wiper accessories is known in the prior art. More specifically, windshield wiper accessories heretofore devised and utilized are known to consist basically of familiar, expected and obvious structural configurations, notwithstanding the myriad of designs encompassed by the crowded prior art which have been developed for the fulfillment of countless objectives and requirements.

Known prior art windshield wiper accessories include U.S. Pat. No. 5,274,875; U.S. Pat. No. 4,122,578; U.S. Pat. No. 3,978,542; U.S. Pat. No. 4,316,303; U.S. Pat. No. 4,183,114; and U.S. Pat. No. Des. 331,556.

While these devices fulfill their respective, particular objectives and requirements, the aforementioned patents do not disclose a new warning light accessory. The inventive device includes a housing having a body portion with a pair of mounting arms extending from the back surface of the body portion. The front surface of the body portion includes a light source that emits light from the front surface when powered. The mounting arms are spaced apart from one another to define a mounting space between them which is designed for inserting a portion of a windshield wiper arm therein. A clamping member is retractably extended through one of the mounting arms into the mounting space to hold the portion of windshield wiper arm between the mounting arms. A switch is electrically coupled to the light source to permit selective powering of the light source. A power source is also included for providing power to the light source.

In these respects, the warning light accessory according to the present invention substantially departs from the conventional concepts and designs of the prior art, and in so doing provides an apparatus primarily developed for the purpose of mounting to the articulation bow of a windshield wiper arm of a vehicle's windshield wiper, preferably, on a rear windshield wiper.

SUMMARY OF THE INVENTION

In view of the foregoing disadvantages inherent in the known types of windshield wiper accessories now present in the prior art, the present invention provides a new warning light accessory construction wherein the same can be utilized for mounting to the articulation bow of a windshield wiper arm of a vehicle's windshield wiper, preferably, on a rear windshield wiper.

The general purpose of the present invention, which will be described subsequently in greater detail, is to provide a new warning light accessory apparatus and method which has many of the advantages of the windshield wiper accessories mentioned heretofore and many novel features that result in a new warning light accessory which is not anticipated, rendered obvious, suggested, or even implied by any of the prior art windshield wiper accessories, either alone or in any combination thereof.

To attain this, the present invention generally comprises a housing having a body portion with a pair of mounting arms extending from the back surface of the body portion. The front surface of the body portion includes a light source that emits light from the front surface when powered. The mounting arms are spaced apart from one another to define a mounting space between them which is designed for inserting a portion of a windshield wiper arm therein. A clamping member is retractably extended through one of the mounting arms into the mounting space to hold the portion of windshield wiper arm between the mounting arms. A switch is electrically coupled to the light source to permit selective powering of the light source. A power source is also included for providing power to the light source.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new warning light accessory apparatus and method which has many of the advantages of the windshield wiper accessories mentioned heretofore and many novel features that result in a new warning light accessory which is not anticipated, rendered obvious, suggested, or even implied by any of the prior art windshield wiper accessories, either alone or in any combination thereof.

It is another object of the present invention to provide a new warning light accessory which may be easily and efficiently manufactured and marketed.

It is a further object of the present invention to provide a new warning light accessory which is of a durable and reliable construction.

An even further object of the present invention is to provide a new warning light accessory which is susceptible of a low cost of manufacture with regard to both materials and labor, and which accordingly is then susceptible of low prices of sale to the consuming public, thereby making such warning light accessory economically available to the buying public.

Still yet another object of the present invention is to provide a new warning light accessory which provides in the apparatuses and methods of the prior art some of the advantages thereof, while simultaneously overcoming some of the disadvantages normally associated therewith.

Still another object of the present invention is to provide a new warning light accessory for mounting to the articulation bow of a windshield wiper arm of a vehicle's windshield wiper, preferably, on a rear windshield wiper.

Yet another object of the present invention is to provide a new warning light accessory which includes a housing having a body portion with a pair of mounting arms extending from the back surface of the body portion. The front surface of the body portion includes a light source that emits light from the front surface when powered. The mounting arms are spaced apart from one another to define a mounting space between them which is designed for inserting a portion of a windshield wiper arm therein. A clamping member is retractably extended through one of the mounting arms into the mounting space to hold the portion of windshield wiper arm between the mounting arms. A switch is electrically coupled to the light source to permit selective powering of the light source. A power source is also included for providing power to the light source.

Still yet another object of the present invention is to provide a new warning light accessory that helps other drivers to see the rear of your vehicle, especially in poor visibility conditions.

Even still another object of the present invention is to provide a new warning light accessory that is easily mountable to a windshield wiper to help prevent collisions by providing a warning light to other vehicles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
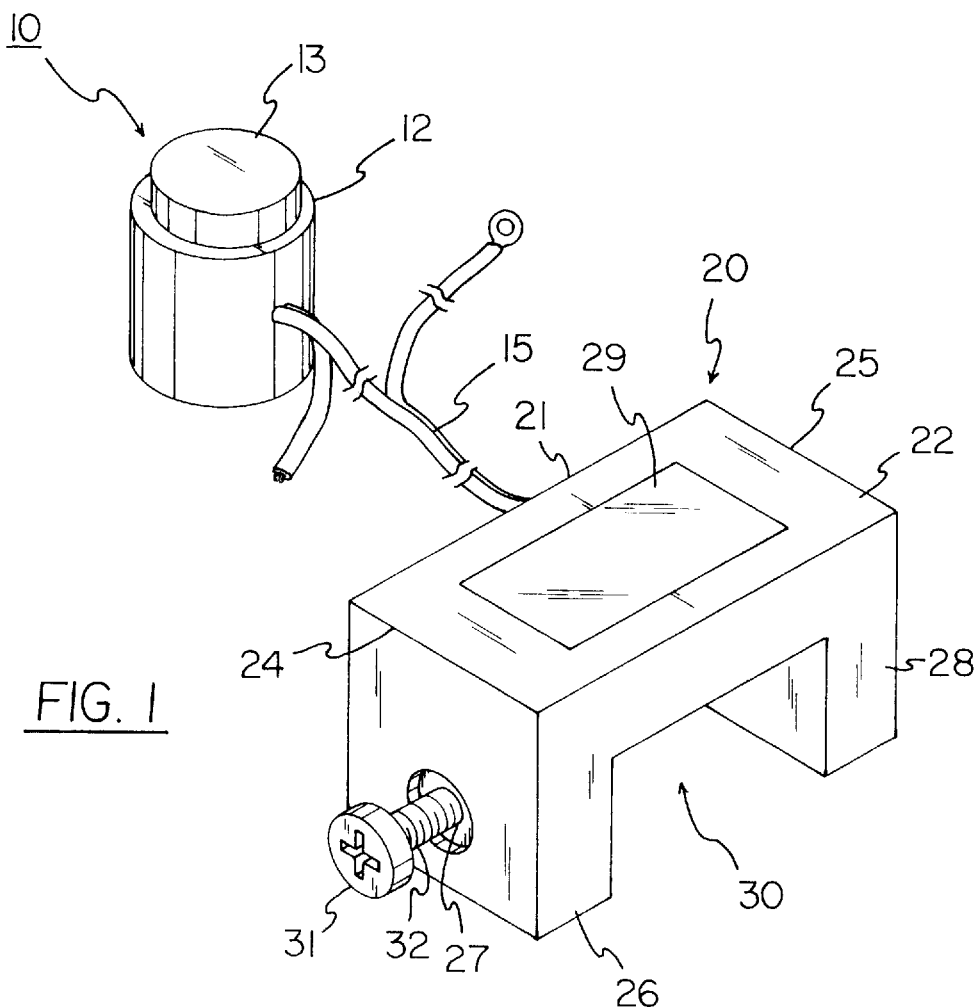
FIG. 1 is a schematic perspective view of a new warning light accessory according to the present invention.

With reference now to the drawings, and in particular to FIGS. 1 through 4 thereof, a new warning light accessory embodying the principles and concepts of the present invention and generally designated by the reference numeral 10 will be described.

The warning light accessory 10 is designed to be mounted to the articulation bow 2 of a windshield wiper arm 1, preferably of a rear window windshield wiper of a vehicle. As best illustrated in FIGS. 1 through 4, the warning light accessory 10 generally comprises a housing 20 having a body portion 21 with a pair of mounting arms 26,28 extending from the back surface 23 of the body portion 21. The front surface 22 of the body portion 21 includes a light source 29 that emits light from the front surface 22 when powered. The mounting arms 26,28 are spaced apart from one another to define a mounting space 30 between them which is designed for inserting a portion 2 of a windshield wiper arm 1 therein. A clamping member 31 is retractably extended through one of the mounting arms 26 into the mounting space 30 to hold the portion 2 of windshield wiper arm 1 between the mounting arms 26,28. A switch 12 is electrically coupled to the light source 29 to permit selective powering of the light source 29. A power source 14 is also included for providing power to the light source 29.

Figure 3:
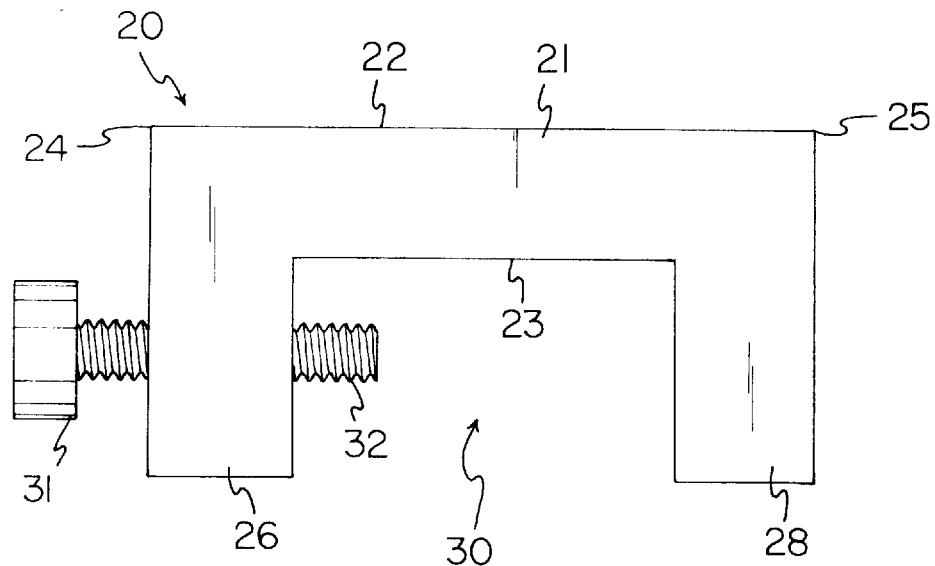
FIG. 3 is a schematic side view of the housing of the present invention.
Figure 4:
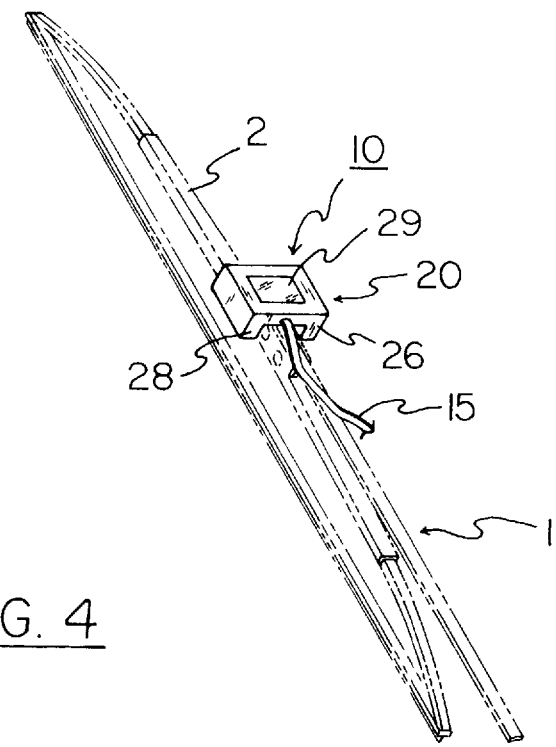
FIG. 4 is a schematic perspective view of the present invention mounted on a windshield wiper arm.

As shown in FIGS. 1 and 3, the housing preferably has a generally rectangular body portion 21 having substantially planar rectangular front and back surfaces 22,23. The mounting arms 26,28 are also generally rectangular and extend from the back surface 23 of the body portion 21. The mounting arms 26,28 are spaced apart to define the mounting space 30 between them. As illustrated in FIG. 4, the mounting space is designed for inserting a portion 1 of a windshield wiper arm 1 therein. Preferably, a mounting arm 26,28 is positioned towards each one of the opposite sides 24,25 of the body portion 21 so the housing 20 takes on a compact U-shape for convenient mounting to a wiper arm 1.

With reference to FIG. 1, the front surface 22 of the body portion 21 includes a light source 29 that emits light from the front surface 22 when powered. While the emitted light may be any color, ideally the light emitted from said the front surface 22 is red so that the light may be easily seen by drivers of other vehicles.

As shown in FIGS. 1 and 3, the clamping member 31 preferably has an elongate threaded portion 32 which is threadably mounted into a threaded bore 27 through one of the mounting arms 26 that opening into the mounting space 30. This permits retractable extension of the threaded portion 32 into the mounting space 30 to hold a portion 2 of windshield wiper arm 1 between the mounting arms 26,28.

Figure 2:
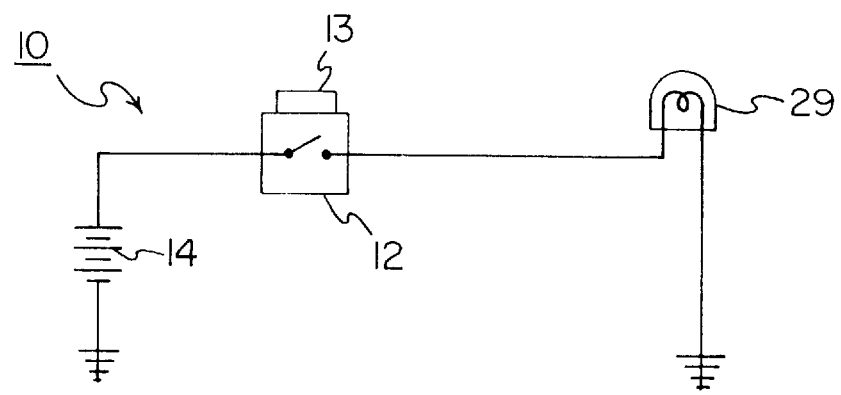
FIG. 2 is an electrical schematic of the present invention.

As illustrated in FIGS. 1 and 2, the switch 12 is electrically coupled electrical wire 15 to the light source 29 to permit selective powering of the light source 29. Preferably, the switch 12 includes an actuator 13 which is positionable in the interior passenger area of a vehicle so that a driver of the vehicle can easily activate the light source 29.

The warning light accessory 10 also includes a power source 14 which provides power to the light source 29. Preferably, the power source 14 is a battery electrically coupled to the switch 12 such that the power source 14 is electrically coupled to the light source 29. Ideally, the power source is a power source of a vehicle such as the main battery of the vehicle.

In use, the housing 20 is mounted to a windshield wiper arm 1, preferably to the articulation bow 2 of the wiper arm 1 by inserting the articulation bow 2 into the mounting space 30. The threaded portion 32 of the clamping member 31 is then screwed into the mounting space 30 to hold the articulation bow 2 between the mounting arms 26,28.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A warning light accessory for mounting to the articulation bow of a windshield wiper arm, said accessory comprising:

a housing having a generally rectangular U-shaped configuration and having a rectangular body portion, and a pair of rectangular mounting arms;

said body portion having substantially planar front and back surfaces and a pair of opposite sides;

said front and back surfaces of said body portion lying in substantially parallel planes to one another;

said sides of said body portion lying in substantially parallel planes to one another and substantially perpendicular to said front and back surfaces of said body portion;

said housing having a pair of generally rectangular U-shaped end faces extending between said sides of said housing, said end faces of said housing lying in substantially parallel planes to one another and extending substantially perpendicular to said sides of said housing said front surface including a light source, said light source emitting light from said front surface when powered;

said mounting arms being extended from said back surface of said body portion, said mounting arms being spaced apart to define a mounting space therebetween for inserting a portion of a windshield wiper arm therein;

one said mounting arm being positioned adjacent one of said sides of said body portion, the other said mounting arm being positioned adjacent the other of said sides of said body portion;

each of said mounting arms having substantially planar inner and outer faces, said inner and outer faces of said mounting arms lying in substantially parallel planes to one another, said inner and outer faces of said mounting arms lying in planes extending substantially perpendicular to said planes of said back surface of said body portion;

said inner faces of said mounting arms facing one another and defining said mounting space therebetween;

said outer face of one of said mounting arms and one of said sides of said body portion being substantially coplanar, said outer face of another of said mounting arms and another of said sides of said body portion being substantially coplanar;

said body portion having a thickness defined between said front and back surfaces of said body portion, each of said mounting arms having a thickness defined between associated inner and outer faces of the respective mounting arm;

said thickness of said body portion being about equal to said thickness of each of said mounting arms;

said body portion having a width defined between said sides of said body portion, said mounting space having a width defined between said inner faces of said mounting arms greater than about one-half said width of said body portion;

a clamping member being retractably extended through one of said mounting arms into said mounting space to hold a portion of windshield wiper arm between said mounting arms;

a switch being electrically coupled to said light source, said switch permitting selective powering of said light source; and a power source for providing power to said light source.

2. The warning light accessory of claim 1, wherein a first of said mounting arms has a threaded bore being extended therethrough, and wherein said clamping member has a threaded portion, said threaded portion being threadably mounted into the bore such that said threaded portion may be retractably extended into said mounting space to hold a portion of windshield wiper arm between said threaded portion and a second of said mounting arms.

3. The warning light accessory of claim 2, wherein said clamping member has a generally disk-shaped head portion outwardly extending from said outer face of said first mounting arm, said head portion having a slot therein adapted for receiving a tip of a screwdriver therein to aid turning of said clamping member in said threaded bore by said screwdriver.

4. The warning light accessory of claim 3, wherein said threaded bore has a cylindrical countersink adjacent said outer face of said first mounting arm, said countersink having a diameter greater than a diameter of a remainder portion of said threaded bore, said countersink receiving said head portion of said clamping member as said threaded portion of said clamping member is threadingly advanced through said threaded bore towards said second mounting arm.

5. The warning light accessory of claim 1, wherein said switch includes an actuator, said actuator being positionable in the interior passenger area of a vehicle.

6. The warning light accessory of claim 5, wherein said actuator is generally cylindrical in shape for aiding the grasping of the actuator with the fingers of a user.

7. The warning light accessory of claim 1, wherein said power source is electrically coupled to said switch such that said power source is electrically coupled to said light source.

8. The warning light accessory of claim 7, wherein said power source is a power source of a vehicle.

9. A warning light accessory for mounting to the articulation bow of a windshield wiper arm, said accessory comprising:

a housing having a generally rectangular U-shaped configuration and having a rectangular body portion, and a pair of rectangular mounting arms;

said body portion having substantially planar rectangular front and back surfaces, and a pair of opposite sides, said front and back surfaces of said body portion being extended between said sides of said body portion;

said front and back surfaces of said body portion lying in substantially parallel planes to one another;

said sides of said body portion lying in substantially parallel planes to one another and substantially perpendicular to said front and back surfaces of said body portion;

said housing having a pair of generally rectangular U-shaped end faces extending between said sides of said housing, said end faces of said housing lying in substantially parallel planes to one another and extending substantially perpendicular to said sides of said housing;

said front surface including a light source, said light source emitting light from said front surface when powered, said light source being substantially coplanar with said front surface of said body portion;

said mounting arms being extended from said back surface of said body portion, said mounting arms being spaced apart to define a mounting space therebetween for inserting a portion of a windshield wiper arm therein, one said mounting arm being positioned adjacent one of said sides of said body portion, the other said mounting arm being positioned adjacent the other of said sides of said body portion;

each of said mounting arms having substantially planar inner and outer faces, said inner and outer faces of said mounting arms lying in substantially parallel planes to one another, said inner and outer faces of said mounting arms lying in planes extending substantially perpendicular to said planes of said back surface of said body portion;

said inner faces of said mounting arms facing one another and defining said mounting space therebetween;

said outer face of one of said mounting arms and one of said sides of said body portion being substantially coplanar, said outer face of another of said mounting arms and another of said sides of said body portion being substantially coplanar;

said body portion having a thickness defined between said front and back surfaces of said body portion, each of said mounting arms having a thickness defined between associated inner and outer faces of the respective mounting arm;

said thickness of said body portion being about equal to said thickness of each of said mounting arms;

said body portion having a width defined between said sides of said body portion, said mounting space having a width defined between said inner faces of said mounting arms greater than about one-half said width of said body portion;

each of said mounting arms having a length defined outwardly from said back surface of said body member, said lengths of said mounting arms being about equal to one another, said length of each of said mounting arms being less than about three times said thickness of said body portion;

a first of said mounting arms having a threaded bore being extended therethrough between said inner and outer faces of said first mounting arm;

a clamping member having a threaded portion, said threaded portion being threadably mounted into the bore such that said threaded portion may be retractably extended into said mounting space to hold a portion of windshield wiper arm between said threaded portion and a second of said mounting arms;

said clamping member having a generally disk-shaped head portion outwardly extending from said outer face of said first mounting arm, said head portion having a slot therein adapted for receiving a tip of a screwdriver therein to aid turning of said clamping member in said threaded bore by said screwdriver;

said threaded bore having a cylindrical countersink adjacent said outer face of said first mounting arm, said countersink having a diameter greater than a diameter of a remainder portion of said threaded bore, said countersink receiving said head portion of said clamping member as said threaded portion of said clamping member is threadingly advanced through said threaded bore towards said second mounting arm;

wherein said mounting space is adapted for extending a windshield wiper arm of a vehicle having a forwardly facing forwards face, and a pair of side faces such that the forwards face of the windshield wiper arm abuts said bottom surface of said body portion, one of said side faces of said windshield wiper arm abuts said inner face of said second mounting arm and another of said side faces abuts said threaded portion of said clamping member so that the side faces of the windshield wiper arm are held between said inner face of said second mounting and said threaded portion of said clamping member;

a switch including an actuator, said switch being electrically coupled to said light source, said switch permitting selective powering of said light source, said actuator being positionable in the interior passenger area of a vehicle, said actuator being generally cylindrical in shape; and a power source for providing power to said light source, said power source being electrically coupled to said switch such that said power source is electrically coupled to said light source.

10. In combination:

a housing having a generally rectangular U-shaped configuration and having a rectangular body portion, and a pair of rectangular mounting arms;

said body portion having substantially planar rectangular front and back surfaces, and a pair of opposite sides, said front and back surfaces of said body portion being extended between said sides of said body portion;

said front and back surfaces of said body portion lying in substantially parallel planes to one another;

said sides of said body portion lying in substantially parallel planes to one another and substantially perpendicular to said front and back surfaces of said body portion;

said housing having a pair of generally rectangular U-shaped end faces extending between said sides of said housing, said end faces of said housing lying in substantially parallel planes to one another and extending substantially perpendicular to said sides of said housing said front surface including a light source, said light source emitting light from said front surface when powered, said light source being substantially coplanar with said front surface of said body portion;

said mounting arms being extended from said back surface of said body portion, said mounting arms being spaced apart to define a mounting space therebetween for inserting a portion of a windshield wiper arm therein, one said mounting arm being positioned adjacent one of said sides of said body portion, the other said mounting arm being positioned adjacent the other of said sides of said body portion;

each of said mounting arms having substantially planar inner and outer faces, said inner and outer faces of said mounting arms lying in substantially parallel planes to one another, said inner and outer faces of said mounting arms lying in planes extending substantially perpendicular to said planes of said back surface of said body portion;

said inner faces of said mounting arms facing one another and defining said mounting space therebetween;

said outer face of one of said mounting arms and one of said sides of said body portion being substantially coplanar, said outer face of another of said mounting arms and another of said sides of said body portion being substantially coplanar;

said body portion having a thickness defined between said front and back surfaces of said body portion, each of said mounting arms having a thickness defined between associated inner and outer faces of the respective mounting arm;

said thickness of said body portion being about equal to said thickness of each of said mounting arms;

said body portion having a width defined between said sides of said body portion, said mounting space having a width defined between said inner faces of said mounting arms greater than about one-half said width of said body portion;

each of said mounting arms having a length defined outwardly from said back surface of said body member, said lengths of said mounting arms being about equal to one another, said length of each of said mounting arms being less than about three times said thickness of said body portion;

a first of said mounting arms having a threaded bore being extended therethrough between said inner and outer faces of said first mounting arm;

a clamping member having a threaded portion, said threaded portion being threadably mounted into the bore such that said threaded portion may be retractably extended into said mounting space to hold a portion of windshield wiper arm between said threaded portion and a second of said mounting arms;

said clamping member having a generally disk-shaped head portion outwardly extending from said outer face of said first mounting arm, said head portion having a slot therein adapted for receiving a tip of a screwdriver therein to aid turning of said clamping member in said threaded bore by said screwdriver;

said threaded bore having a cylindrical countersink adjacent said outer face of said first mounting arm, said countersink having a diameter greater than a diameter of a remainder portion of said threaded bore, said countersink receiving said head portion of said clamping member as said threaded portion of said clamping member is threadingly advanced through said threaded bore towards said second mounting arm;

a windshield wiper arm of a vehicle being extended through said mounting space of said housing, said windshield wiper arm of said vehicle having a forwardly facing forwards face, and a pair of side faces, the forwards face of the windshield wiper arm abutting said bottom surface of said body portion, one of said side faces of said windshield wiper arm abutting said inner face of said second mounting arm and another of said side faces abutting said threaded portion of said clamping member so that the side faces of the windshield wiper arm are held between said inner face of said second mounting and said threaded portion of said clamping member;

a switch including an actuator, said switch being electrically coupled to said light source, said switch permitting selective powering of said light source, said actuator being positionable in the interior passenger area of a vehicle, said actuator being generally cylindrical in shape; and a power source for providing power to said light source, said power source being electrically coupled to said switch such that said power source is electrically coupled to said light source.

\* \* \* \* \*